US012596550B2

(12) United States Patent (10) Patent No.: US 12,596,550 B2

Alexander (45) Date of Patent: Apr. 7, 2026

(54) DUAL-MODE FLOATING POINT PROCESSOR OPERATION

(71) Applicant: Graphcore Limited, Bristol (GB)

(72) Inventor: Alan Alexander, Wotton-Under-Edge (GB)

(73) Assignee: GRAPHCORE LIMITED, Bristol (GB)

( * ) Notice: Subject to any disclaimer, the term of this patent is extended or adjusted under 35 U.S.C. 154(b) by 187 days.

(21) Appl. No.: 18/155,834

(22) Filed: Jan. 18, 2023

(65) Prior Publication Data

US 2023/0244488 A1 Aug. 3, 2023

(30) Foreign Application Priority Data

Feb. 3, 2022 (GB) ..................................... 2201400

(51) Int. Cl.
*G06F 9/30* (2018.01)
*G06F 9/38* (2018.01)
*G06F 7/483* (2006.01)
*G06F 7/499* (2006.01)

(52) U.S. Cl.
CPC ........ *G06F 9/3001* (2013.01); *G06F 9/30189* (2013.01); *G06F 9/3851* (2013.01); *G06F 9/3865* (2013.01); *G06F 7/483* (2013.01); *G06F 7/49905* (2013.01)

(58) Field of Classification Search
CPC .. G06F 9/30189; G06F 9/3865; G06F 9/3001; G06F 7/483; G06F 9/3851
See application file for complete search history.

(56) References Cited

U.S. PATENT DOCUMENTS

| | | | |
|---|---|---|---|
| 10,564,931 B1 * | 2/2020 | Witek | .................. G06F 9/30189 |
| 11,169,777 B2 | 11/2021 | Graphcore | |
| 2013/0212139 A1 * | 8/2013 | Gschwind | ........... G06F 7/49905 |
| | | | 708/204 |
| 2019/0369960 A1 | 12/2019 | Mueller | |
| 2020/0264840 A1 * | 8/2020 | Lichtenau | ............. G06F 9/3001 |

FOREIGN PATENT DOCUMENTS

EP 4318222 A1 * 2/2024 ........... G06F 9/3001

OTHER PUBLICATIONS

Yi-Ping You, Tsung-Chun Lin, and Wuu Yang, "Translating AArch64 Floating-Point Instruction Set to the x86-64 Platform", Aug. 5,ACM, pp. 1-7 (Year: 2019).*
Search Report dated Oct. 11, 2022 for United Kingdom Patent Application No. GB2201400.5 3 pages.

* cited by examiner

*Primary Examiner* — Courtney P Spann
(74) *Attorney, Agent, or Firm* — HAYNES AND BOONE, LLP

(57) ABSTRACT

By providing a mode indication, an execution unit is operable to operate in two separate modes, each of which cause the execution unit to perform calculations by interpreting the same bit string (the first of the bit strings) as representing one of two different values. When operating in the first mode, the first of the bit string represents an undefined value, in other words a NaN. When operating in the second mode, the first of the bit strings represents a negative zero. Hence, the same string of bits can represent either a NaN or a negative zero depending upon the mode of operation of the processor. Since it is not necessary to reserve more than one bit string to represent these two special values, the remaining combinations of bits are available to represent other values.

21 Claims, 10 Drawing Sheets

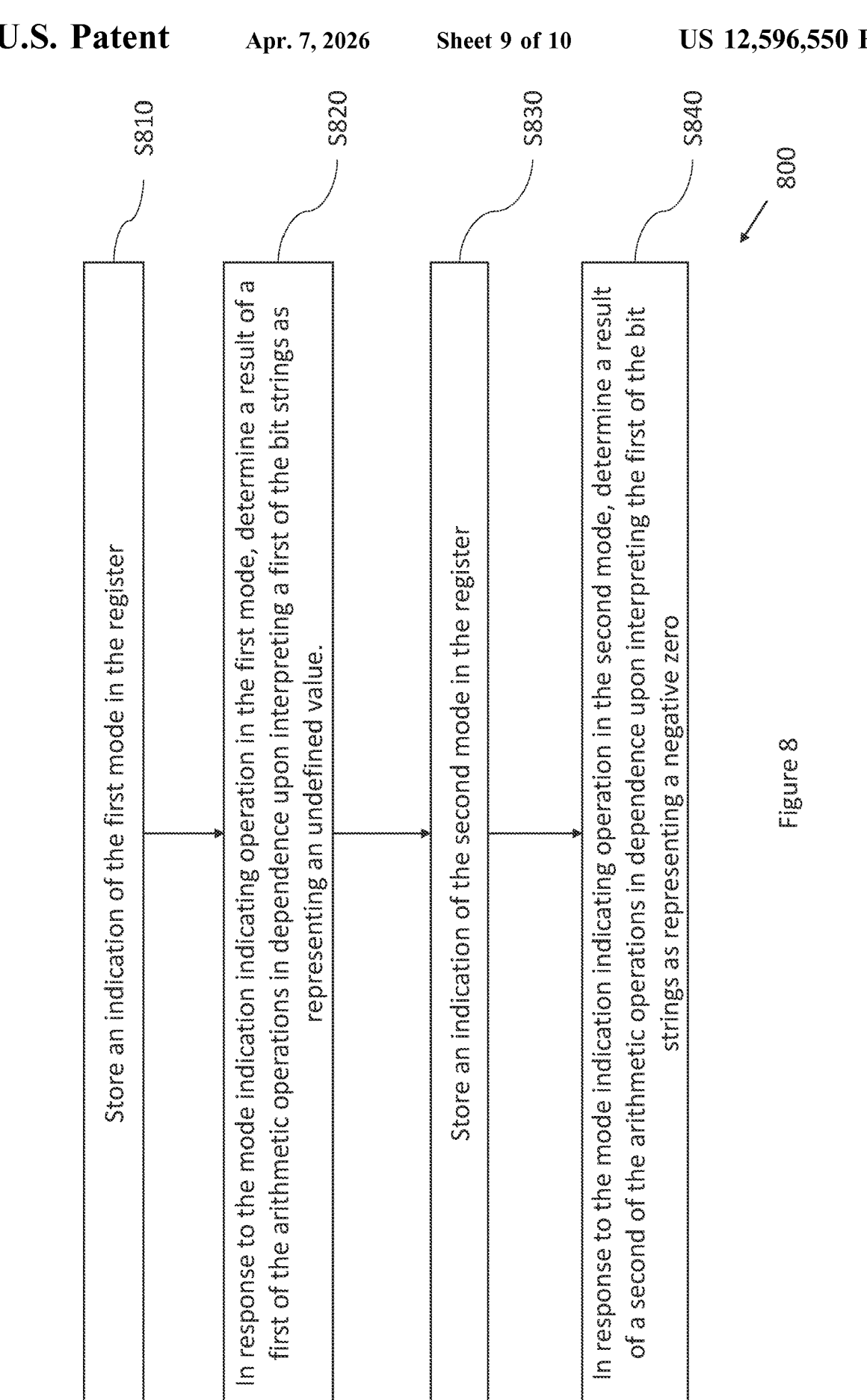

S810

Store an indication of the first mode in the register

S820

In response to the mode indication indicating operation in the first mode, determine a result of a first of the arithmetic operations in dependence upon interpreting a first of the bit strings as representing an undefined value.

S830

Store an indication of the second mode in the register

S840

In response to the mode indication indicating operation in the second mode, determine a result of a second of the arithmetic operations in dependence upon interpreting the first of the bit strings as representing a negative zero

DUAL-MODE FLOATING POINT PROCESSOR OPERATION

CROSS-REFERENCE TO RELATED APPLICATIONS

The present application claims priority to United Kingdom Patent Application No. GB2201400.5 filed Feb. 3, 2022.

TECHNICAL FIELD

The present disclosure relates to a processing device comprising an execution unit for performing operations on floating-point values.

BACKGROUND

In computing, bit sequences of predefined sizes are used to represent numbers. The particular representation of a bit sequence determines how that bit sequence is interpreted.

One form of representation is the floating-point representation, which is often used to approximately represent real numbers. Certain floating-point formats are laid out in the IEEE Standard 754. The floating-point representation comprises 3 separate components, i.e. a sign component, a mantissa component, and an exponent component. In the so-called single-precision (i.e. 32-bit) floating point representation (according to IEEE Standard 754), the sign component consists of a single bit, the exponent consists of 8 bits, and the mantissa consists of 23 bits. In the so-called half-precision (i.e. 16-bit) floating-point representation (according to IEEE standard 754), the sign component consists of a single bit, the mantissa consists of 10 bits, and the exponent consists of 5 bits. In most cases, a number is given from these 3 components by the following formula:

$$(-1)^{signbit} \times I \cdot mantissa \times 2^{exponentbits\text{-}offset}$$

The displayed "offset" to the exponent is dependent upon the range of values required. IEEE 754 has chosen values as follows. In the single-precision representation, the offset is equal to 127. In the half-precision format, the offset is equal to 15.

Here "I" is an implicit bit, which is derived from the exponent. In the case that the exponent bit sequence consists of anything other than all zeros or all ones, the implicit bit is equal to one and the number is known as a normal (abbreviated to "Norm" herein). In this case, the floating-point number is given by:

$$(-1)^{signbit} \times 1 \cdot mantissa \times 2^{exponentbits\text{-}offset}$$

In the case that the exponent bit sequence consists of all zeros, the implicit bit is equal to zero and the number is known as denormalised or subnormal, (abbreviated to "denorm" herein). In this case, the floating-point number is given by:

$$(-1)^{signbit} \times 0 \cdot mantissa \times 2^{exponentbits\text{-}offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN (Not a Number). NaN is a numeric data type value representing an undefined or unrepresentable value. The presence of a NaN in the results of a calculation is often taken to signal an exception. In any event, subsequent steps in a calculation cannot be carried out.

Table 1 summarises how the floating-point numbers are interpreted for different ranges of the exponent and the mantissa according to the IEEE 754 standard.

TABLE 1

| Exponent | Mantissa Zero | Mantissa non-zero |
|---|---|---|
| $00_H$ | zero, −0 | denormal numbers |
| $01_H, \ldots, FE_H$ | | normalized value |
| $FF_H$ | ±infinity | NaN (quiet, signalling) |

As shown in table 1, if the exponent consists of all zeros, and the mantissa consists of all zeros, the floating-point number is taken to be equal to zero (either +0, −0). If the exponent consists of all zeros and the mantissa is non-zero, the floating-point number is a denorm. If the exponent consists of all ones and the mantissa consists of all zeros, the floating point number is taken to represent ±infinity. If the exponent consists of all ones and the mantissa is non-zero, the floating-point number is taken to be equal to NaN. In the case that the exponent is anything other than all zeros and all ones, the floating-point number is a norm. The IEEE standard lays out a number of different NaN codes; represented by different mantissa values.

As shown in the table, there are broadly two types of NaN result that may result. A quiet NaN is a NaN that does not raise any additional exceptions (although an exception may be raised upon its creation) as it propagates through operations. In contrast, a signalling NaN is a special form of NaN, which when consumed by an operation, will raise an invalid operation exception and then, if appropriate, be transformed into a quiet NaN that may propagate through further operations without raising any further exceptions.

SUMMARY

Beyond the IEEE standard, there is a drive to provide processors that are adapted for performing operations with floating point numbers having fewer bits (e.g. 8 bits) than those available in the IEEE single precision and half-precision formats. Although there is a likely reduction in the range and precision provided by such formats, there is the advantage that each individual floating-point number requires reduced storage space in memory and in the processor registers. Additionally, each such number is less demanding in terms of the circuitry required to process the number, due to the reduced number of mantissa and exponent bits that must be handled.

In any floating-point format, a limited number of bits are available for representing different floating-point values, meaning that one challenge is to provide a processor capable of handling certain special values (e.g. NaNs) when performing operations, whilst maximising the range of values representable by bit strings of a given length. This increasingly becomes an issue when a processor is configured to perform arithmetic operations using floating point numbers represented by a smaller number (e.g. 8) of bits.

According a first aspect, there is provided a processing device comprising: at least one execution unit configured to execute instructions to perform arithmetic operations, each of which takes at least one of a set of floating-point values as an input and produces as a result, at least one of the set of floating-point values as an output, wherein each of the set of floating-point values is represented by a respective one of a plurality of bit strings, each of the plurality of bit strings having a predefined length and provided according to a first floating-point format, at least one register configured to store a mode indication indicating operation in a first mode or a second mode, wherein the execution unit is configured to: when performing a first of the arithmetic operations, in response to the mode indication indicating operation in the first mode, determine a result of a first of the arithmetic operations in dependence upon interpreting a first of the bit strings as representing an undefined value; and when performing a second of the arithmetic operations, in response to the mode indication indicating operation in the second mode, determine a result of the second of the arithmetic operations in dependence upon interpreting the first of the bit strings as representing a negative zero.

By providing a mode indication, the execution unit is operable to operate in two separate modes, each of which cause the execution unit to perform calculations by interpreting the same bit string (the first of the bit strings) as representing one of two different values. When operating in the first mode, the first of the bit string represents an undefined value, in other words a NaN. When operating in the second mode, the first of the bit strings represents a negative zero. Hence, the same string of bits can represent either a NaN or a negative zero depending upon the mode of operation of the processor. Since it is not necessary to reserve more than one bit string to represent these two special values, the remaining combinations of bits are available to represent other values.

According to a second aspect, there is provided a method comprising: storing a mode indication indicating operation in a first mode or a second mode; and executing instructions to perform arithmetic operations, each of which takes at least one of a set of floating-point values as an input and produces as a result, at least one of the set of floating-point values as an output, wherein each of the set of floating-point values is represented by a respective one of a plurality of bit strings, each of the plurality of bit strings having a predefined length and provided according to a first floating-point format; when performing a first of the arithmetic operations, in response to the mode indication indicating operation in the first mode, determining a result of a first of the arithmetic operations in dependence upon interpreting a first of the bit strings as representing an undefined value; and when performing a second of the arithmetic operations, in response to the mode indication indicating operation in the second mode, determining a result of the second of the arithmetic operations in dependence upon interpreting the first of the bit strings as representing a negative zero.

According to a third aspect, there is provided a computer program comprising a set of computer executable instructions, which when executed by at least one processor cause a method to be performed, the method comprising: storing a mode indication indicating operation in a first mode or a second mode; and executing instructions to perform arithmetic operations, each of which takes at least one of a set of floating-point values as an input and produces as a result, at least one of the set of floating-point values as an output, wherein each of the set of floating-point values is represented by a respective one of a plurality of bit strings, each of the plurality of bit strings having a predefined length and provided according to a first floating-point format; when performing a first of the arithmetic operations, in response to the mode indication indicating operation in the first mode, determining a result of a first of the arithmetic operations in dependence upon interpreting a first of the bit strings as representing an undefined value; and when performing a second of the arithmetic operations, in response to the mode indication indicating operation in the second mode, determining a result of the second of the arithmetic operations in dependence upon interpreting the first of the bit strings as representing a negative zero.

According to a fourth aspect, there is provided a non-transitory computer readable medium storing the computer program according to the third aspect.

BRIEF DESCRIPTION OF DRAWINGS

To assist understanding of the present disclosure and to show how embodiments may be put into effect, reference is made by way of example to the accompanying drawings in which:

FIG. 8 illustrates a method for performing multiple arithmetic operations, where the two different modes are both used.

DETAILED DESCRIPTION

Embodiments are implemented in a processing device, which may take the form of a tile of a multi-tile processing unit. An example of such a multi-tile processing unit is described in detail in U.S. application Ser. No. 16/276,834, which is incorporated by reference.

In some embodiments, the processing device is a device adapted for performing neural network processing. An implementation of neural networks involves the storage and manipulation of floating-point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as artificial neurons or simply neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

Figure 1:
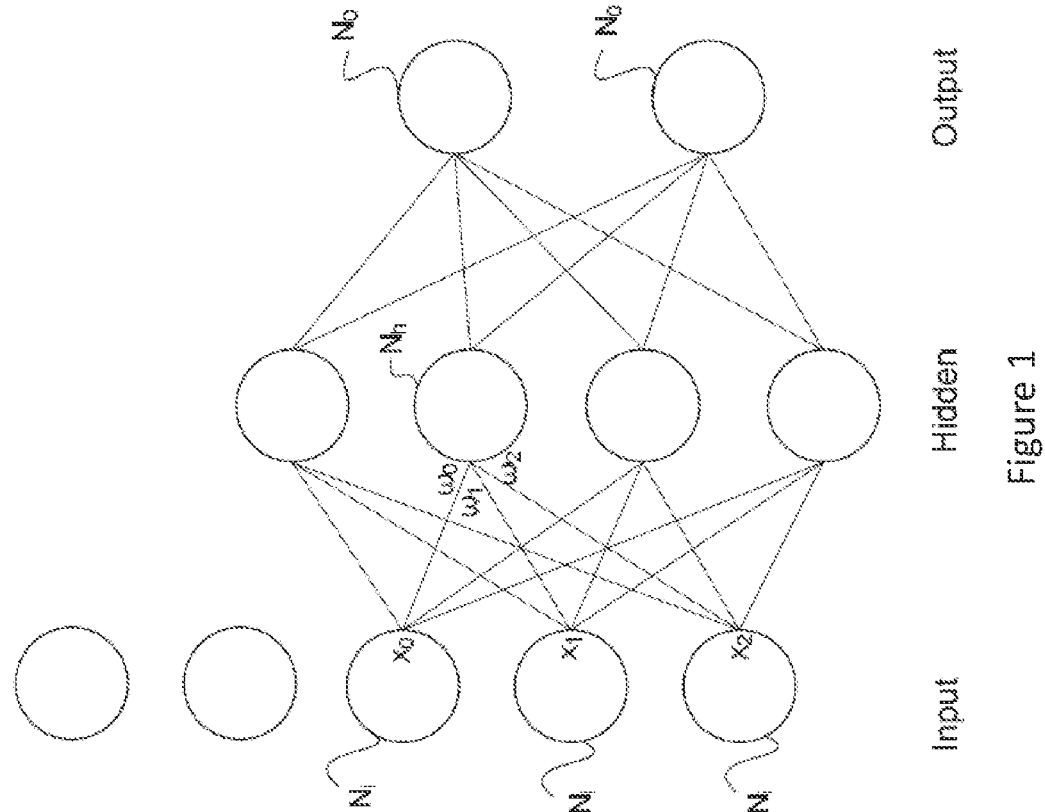
FIG. 1 is a highly simplified schematic view of a neural net.
Figure 1A:
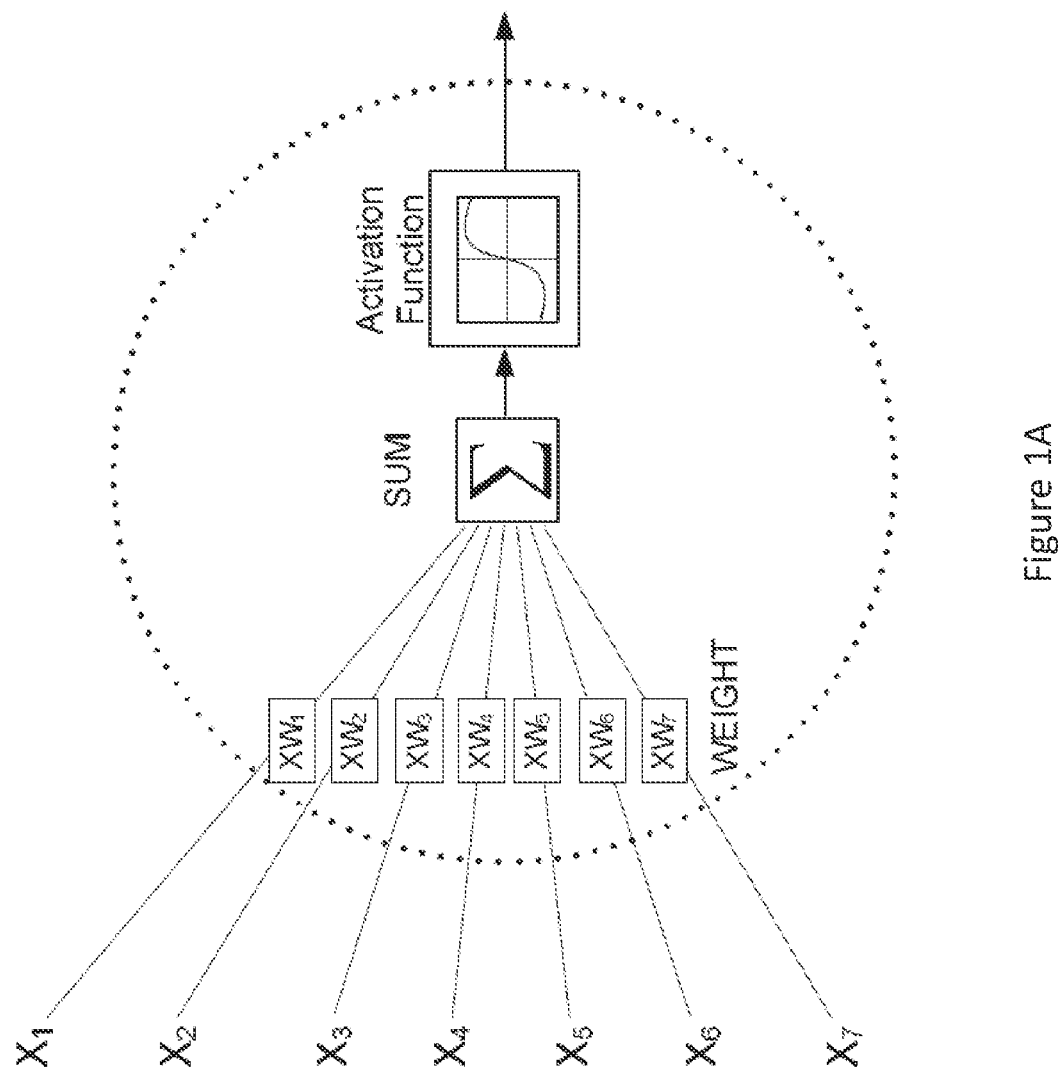
FIG. 1A is a highly simplified schematic view of an artificial neuron.

FIG. 1 shows a simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to at least one node in the hidden layer. At least one node in the hidden layer can perform an activation function on the data which is provided to them and can generate similarly an output vector which is supplied to one or more nodes No in the output layer No. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

The following describes components of a processor having an architecture which has been developed to address issues arising in the computations involved in machine intelligence applications. The processor described herein may be used as part of a work accelerator, which receives a workload from an application running on a host computer, the workload generally being in the form of very large data sets to be processed (such as the large experience data sets used by a machine intelligence algorithm to learn a knowledge model, or the data from which to perform a prediction or inference using a previously-learned knowledge model). An aim of the architecture presented herein is to process these very large amounts of data highly efficiently. The processor architecture has been developed for processing workloads involved in machine intelligence. Nonetheless, it will be apparent that the disclosed architecture may also be suitable for other workloads sharing similar characteristics.

Figure 2:
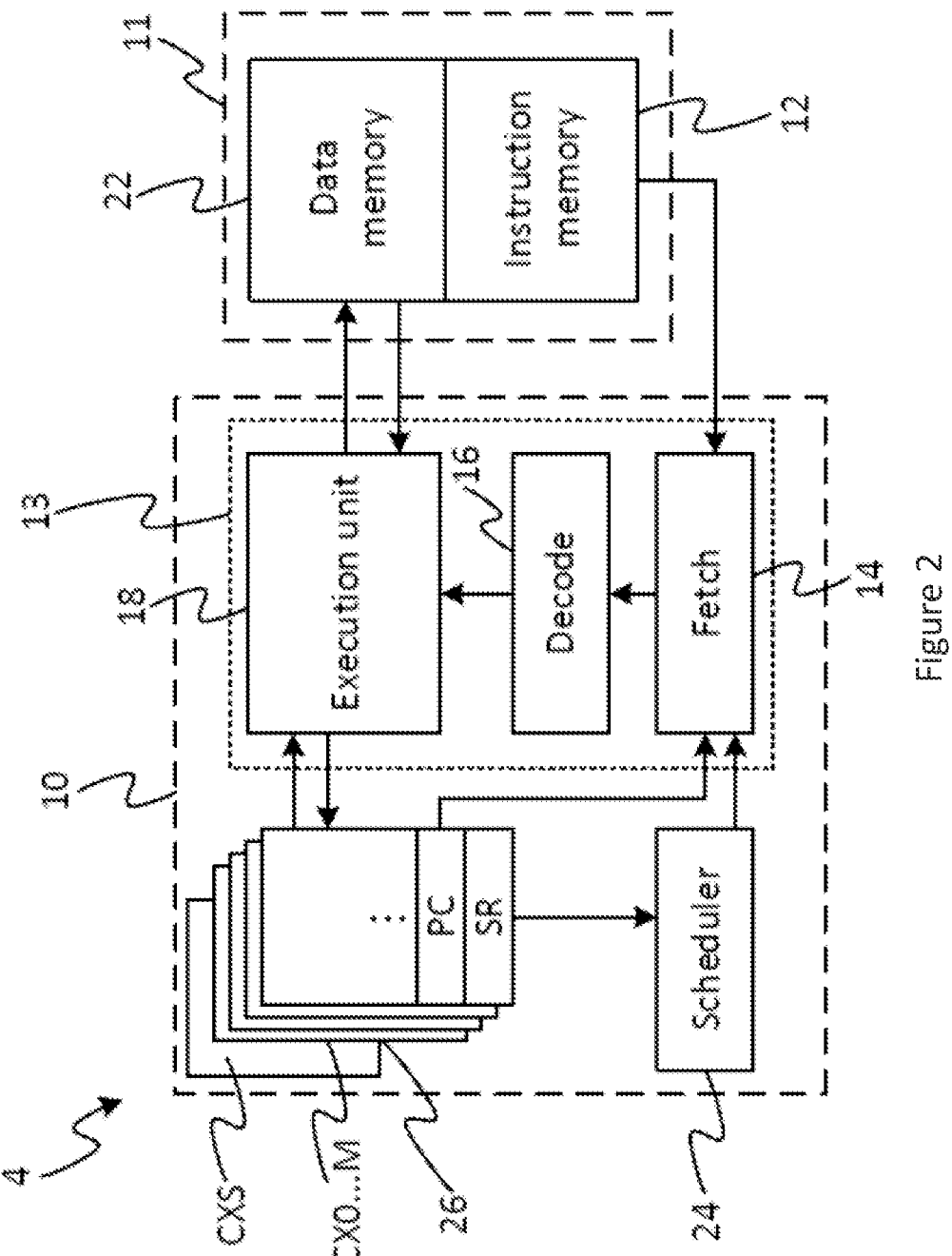
FIG. 2 is a schematic block diagram of a multi-threaded processor.

FIG. 2 illustrates an example of a processing device 4 in accordance with embodiments of the present disclosure. For instance the processing device 4 may be one tile of an array of like processor tiles on a same chip, or may be implemented as a stand-alone processor on its own chip.

The processing device 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The processing unit 10 interleaves execution of a plurality of worker threads, and a supervisor subprogram which may be structured as one or more supervisor threads. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. (N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another). Note that one source of errors that could be encountered are overflow conditions. These are reduced in normal running of the program by using max/min limit values in half-precision calculations.

Figure 4:
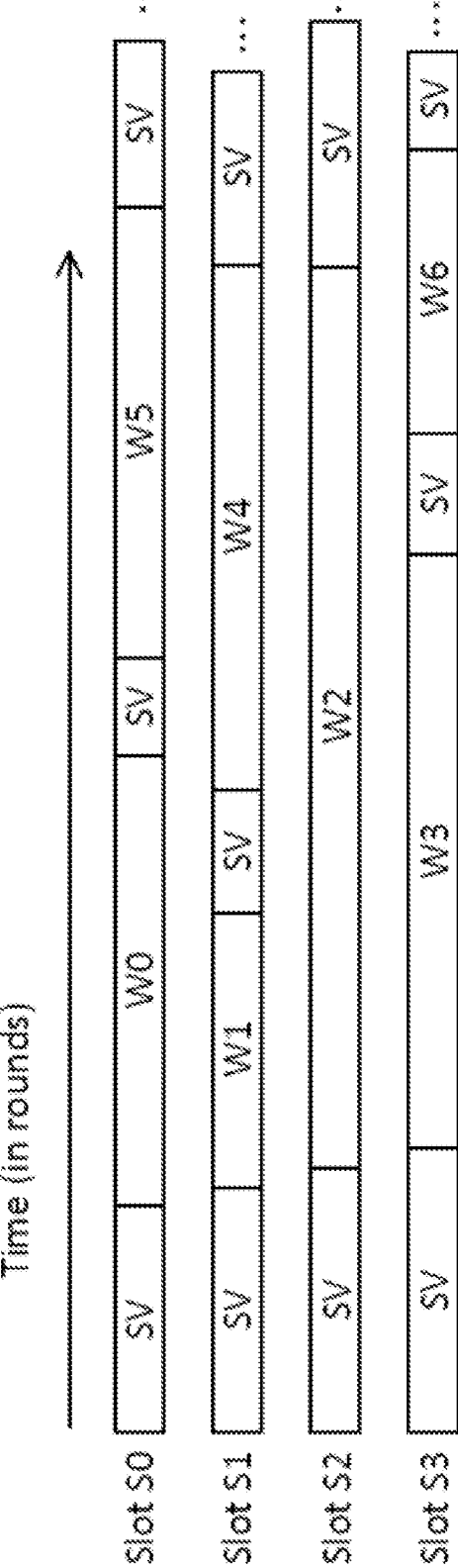
FIG. 4 schematically illustrates a supervisor thread and plurality of worker threads running in a plurality of interleaved time slots.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. FIG. 4 illustrates an example as to how the threads may be scheduled for execution in the processing unit 10. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

Figure 3:
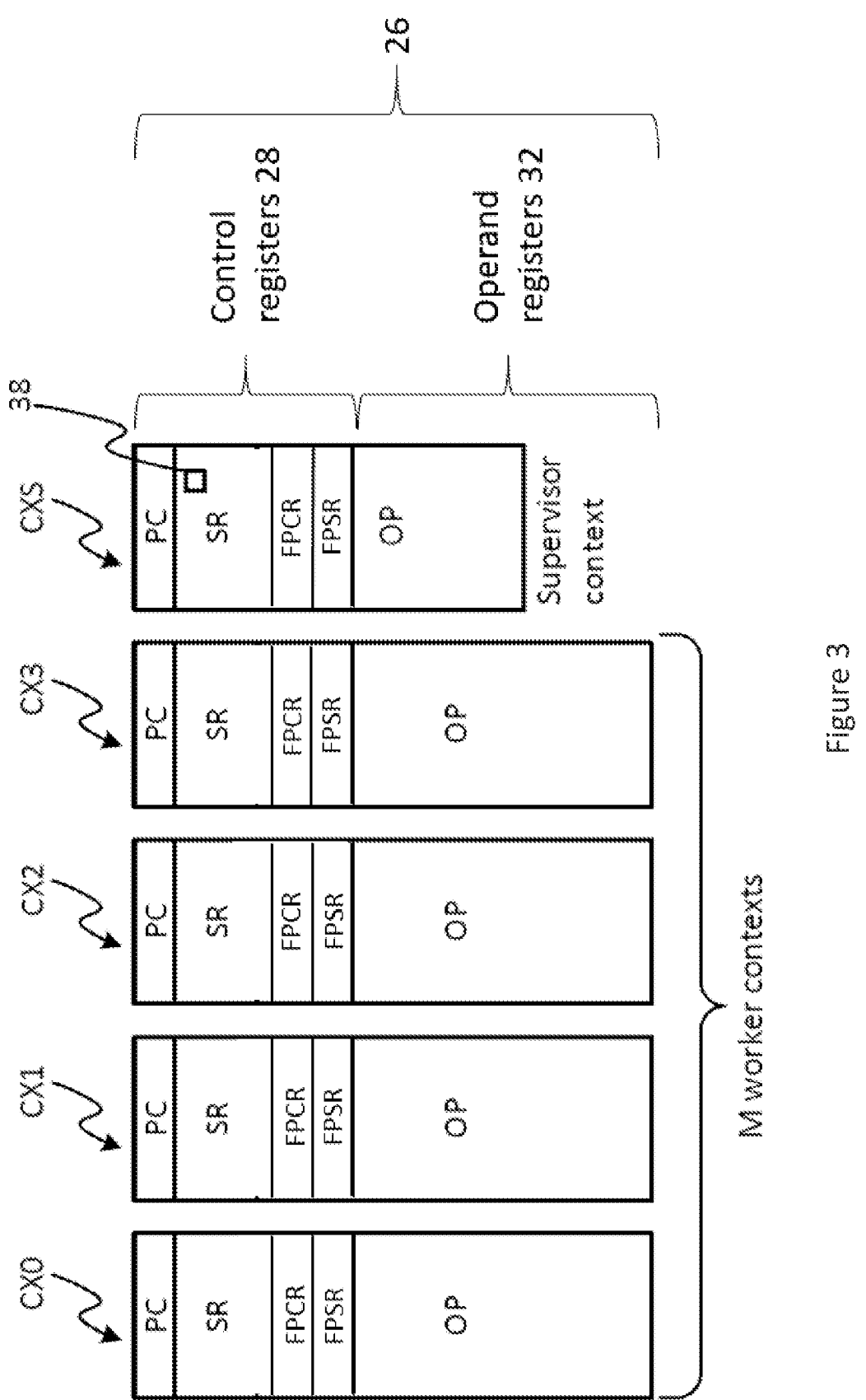
FIG. 3 is a schematic block diagram of a plurality of thread contexts.

An example of the registers making up each of the context register files 26 is illustrated schematically in FIG. 3. Each of the context register files 26 comprises a respective one or more control registers 28, comprising at least a program counter (PC) for the respective thread (for keeping track of the instruction address at which the thread is currently executing) and a set of one or more status registers (SR) recording a current status of the respective thread (such as whether it is currently running or paused, e.g. because it has encountered an error). In embodiments of the present invention, the control registers 28 include a floating-point control register FPCR and a floating-point status register FPSR for handling different modes of operation in overflow conditions. Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As noted above, many computer calculations involve the use of floating-point numbers to represent real numbers. The instructions in instruction memory 12 defined by a particular thread may be executed by the execution unit 18 to perform arithmetic operations using floating point numbers. The result of these calculations using floating point numbers are output into the operand registers 32 before being stored in data memory 22.

The processing device 4 supports a number of floating-point number formats on which the execution unit 18 is configured to perform operations. The processing device 4 supports, for example, scalar floating-point number formats, including single-precision and half-precision floating point formats. The processing device 4 also supports an 8-bit floating point precision. The execution unit 18 may perform a variety of different arithmetic operations using such scalar floating-point number formats according to the instructions included in the instruction memory 12, with the results being stored in data memory 22. The processor module 4 also supports vector floating-point number formats, including vectors of different lengths of single-precision floating point numbers, half-precision floating point numbers, or 8-bit floating point numbers. The execution unit 18 may perform a variety of different arithmetic operations—such as addition or accumulation operations—using such vectors of floating-point numbers.

The execution unit 18 shown in FIG. 2 is the part of the processing unit 10 responsible for performing arithmetic operations on floating-point numbers. The processing unit 10 may also include additional execution units for performing further operations, e.g. load/store operations. Reference herein to operations being performed by the processing unit 10 is understood to refer to operations being performed by at least one execution unit of the processing unit 10.

As discussed, the range of floating-point numbers representable by a particular string of bits may decrease with the number of bits used to represent each floating point number. According to the IEEE 754 standard, the largest value representable in the single-precision (i.e. 32 bit) floating point format is approximately $3.403 \times 10^{38}$, whereas the smallest positive value representable is approximately $1.401 \times 10^{-45}$. Similarly, in the IEEE standard half-precision format, the largest representable value is 65504, whereas the smallest positive representable value is $5.96 \times 10^{-8}$. If the processing device 4 performs arithmetic operations using floating point values that produce results having magnitudes that are larger than the maximum value for the relevant format (e.g. $3.403 \times 10^{38}$ for single-precision or 65504 for half-precision), an overflow condition occurs. On the other hand, If the processing device 4 performs arithmetic operations using floating point values that produce results having magnitudes that are smaller than the minimum positive value for the relevant format (e.g. $1.401 \times 10^{-45}$ for single-precision or $5.96 \times 10^{-8}$ for half-precision), an underflow condition occurs.

It would be appreciated that, when using floating-point numbers represented by fewer than 16 bits, the range of representable values tends to decrease further.

In order to maximise the range of values representable for a given floating-point format, it is desirable to reduce the number of bit combinations (or bit strings) that are used to represent certain special values. Table 2 illustrates an example as to how the processing device 4 may interpret different bit strings (also referred to as codes) of a given floating point format (referred to herein as the "first floating-point format"). In example embodiments, this floating-point format is an 8-bit floating point format, meaning that all of the floating-point values provided according to the format are represented by a sequence of 8 bits.

TABLE 2

| Sign | Exponent | Mantissa | Interpretation |
|------|----------|----------|----------------|
| 0, 1 | $01_H, \ldots, FF_H$ | $00_H, \ldots, FF_H$ | Normal numbers |
| 0, 1 | $00_H$ | $01_H, \ldots, FF_H$ | Denorms |
| 0 | $00_H$ | $00_H$ | Unsigned Zero, Positive Zero |
| 1 | $00_H$ | $00_H$ | Nan, Negative Zero |

As indicated by table 2, a bit string in which the exponent is non-zero is used to represent normal numbers. A bit string in which the exponent is zero, but the mantissa is non-zero is used to represent denorms (or subnormal numbers). As will be appreciated from table 2, all but two of the bit combinations are reserved for representing non-zero real numbers. Since only two codes (i.e. those where the exponent and the mantissa are both all zeros) remain for representing other values, one challenge is how to enable the processing device 4 to handle these other values.

According to embodiments, a first mode of operation of the processing device 4 is defined. In the first mode, an execution unit 18 of the device 4 interprets a bit string (referred to herein as the "first bit string" or the "first of the bit strings") in which the sign bit is one and the mantissa and exponent are zero as representing a NaN. Allowing for representation of a NaN facilitates debugging of the instructions executed on the processing unit 10 by allowing a programmer to more readily identify the operations that have led to the NaN results. The debugging mode may be set automatically by a debugging tool, or manually as part of a debugging operation. When the execution unit 18 performs an arithmetic operation using a NaN as an input, those operations also result in NaNs. In this way, the NaN propagates through operations producing further NaNs indicative of error conditions.

The NaN represented by the first bit string is a signalling NaN, and therefore, when the execution unit 18 performs operations taking this NaN as an input, the results of those operations raise an exception by setting an invalid operation flag in a register of the processing device 4.

When operating in the first mode, only one code is available to the processing device 4 for representing a zero. As shown in table 2, this code is a bit string consisting only of zeros. Since only this one code is available for representing a zero, the execution unit 18 interprets this code as being an unsigned zero.

A second mode of operation of the processing device 4 is defined. When operating in the second mode, the same first bit string, which in the first mode represents a NaN, is interpreted by the processing device 4 as representing a negative zero. Allowing for representation of a negative zero may enable the processing device 4 to achieve greater accuracy in certain calculations.

When operating in the first mode, the execution unit 18 may produce the first bit string when operations having undefined or unrepresentable results are performed. The first bit string in this case is the result of the operation.

As a first example of a calculation that may generate the first bit string (representing a NaN) when operating in the first mode, the execution unit 18 may perform the following division operation in response to execution of an instruction:

$$\frac{x}{0} = NaN \qquad \text{Equation 1}$$

When performing this operation, both x and 0 may serve as operands to a divide instruction executed by the execution unit 18. Both the x and 0 operands are represented by their own codes according to the first floating point format and provided in operand registers 32 of the processing unit 10. Since the result of a divide by zero is undefined and the execution unit 18 is operating in the first mode, the execution unit 18 generates the first bit string, which represents a NaN, as a result of the divide operation. The first bit string is stored in a further operand register 32 of the processing unit 10.

As a second example of a calculation that may generate the first bit string (representing a NaN) when operating in the first mode, the execution unit 18 may perform the following multiplication operation in response to execution of an instruction:

$$(X)*(Y)=NaN \qquad \text{Equation 2}$$

When performing this operation, both X and Y may serve as operands to a multiply instruction executed by the execution unit 18. Both the x and Y operands are represented by their own codes that are provided according to the first floating point format and provided in operand registers 32 of the processing unit 10. If the magnitude of X and Y is such that their multiplication produces a result which is too large to be representing in the first-floating point format, an overflow condition occurs. In this case, since the execution unit 18 is operating in the first mode, the execution unit 18 generates the first bit string, which represents a NaN, as a result of the multiplication operation. The first bit string is stored in a further operand register 32 of the processing unit 10.

Also, when operating in the first mode, the processing device 4 may perform an operation that takes the first bit string as an input. Since the first bit string represents a NaN in this case, the first bit string is also produced as the result of any arithmetic operation taking the first bit string as an input. This may be represented as:

$$f(NaN)=NaN \qquad \text{Equation 3}$$

Therefore, when the execution unit 18, operating in the first mode, executes an instruction taking the first bit string as an input operand, the processing unit 10 stores the first bit string as the result. In this way, the NaN propagates through subsequent calculations. Since the first bit string represents a signalling NaN, the operation represented by Equation 3 will cause the processing unit 10 to raise an exception by setting an invalid operation flag held in a register of the processing unit 10.

When operating in the second mode, and performing an arithmetic operation taking the first bit string as input, the execution unit 18 applies the rules of arithmetic for handling negative zero as that input. As an example of a calculation that may be performed using negative zero, the processing unit 10 may, when operating in the second mode, perform the following operation:

$$(-0)*(-x)=+0 \qquad \text{Equation 4}$$

When performing this operation, both −0 and −x serve as operands to a multiply instruction executed by the execution unit 18. The −0 is represented by the first bit string, which is held in an operand register 32 of the processing unit 10 that executes the instruction, and the −x operand is represented by a further bit string (which is one of the bit strings used to represent normal or denormal numbers) also held in an operand register 32 of the processing unit 10. The execution unit 18 processes the first bit string as a −0 and produces the result of +0, which is output to an operand register 32 of the processing unit 10.

Also, when operating in the second mode, the execution unit 18 may produce the first bit string when performing an operation that can be taken to have negative zero as its result. The first bit string in this case is the result of the operation. As an example of a calculation that may be performed having negative zero as a result, the execution unit 18 may perform the following operation when operating in the second mode:

$$\frac{+0}{-x} = -0 \qquad \text{Equation 5}$$

When performing this operation, both +0 and −x may serve as operands to a divide instruction executed by the execution unit 18. The +0 is represented by a bit string for representing positive zero (which may be a string of all zeros, as shown in Table 2) held in an operand register 32 of the processing unit 10, whereas the −x operand is represented by a further bit string (which is one of the bits strings reserved for representing normal or denormal numbers) also held in an operand register 32 of the processing unit 10. The first bit string (representing −0), which result from the operation of Equation 5, is output to an operand register 32 of the processing unit 10.

It would be appreciated that, depending upon the mode of operation of the processing device 4, operations on the same bit strings may yield different resulting bit strings. For example, the operation represented by Equation 1 has been discussed as being performed in the first mode. This operation yields the first bit string when operating in the first mode. However, when the same operation on the same input codes is instead performed when operating in the second mode, the execution unit 18 may produce as a result, a bit string (e.g. all 1s) representing the saturated value (i.e. the maximum value representable) in the first floating point format, rather than the first bit string that is produced when operating in the first mode.

As another example, the operation represented by Equation 2 has been described above as being performed in the first mode. This operation yields the first bit string when operating in the first mode. However, when the same operation on the same input codes is instead performed when operating in the second mode, the execution unit 18 may produce as a result, a bit string (e.g. all 1s) representing the saturated value (i.e. the maximum value representable) in the first floating point format, rather than the first bit string that is produced when operating in the first mode.

As another example, the operation represented by Equation 4 has been described above as being performed in the second mode. This operation yields a bit string (e.g. all zeros) representing a positive zero when operating in the second mode. However, when the same operation on the same input codes is instead performed when operating in the first mode (in which case the −0 input is instead a NaN input), the execution unit 18 instead produces as a result, the first bit string, representing a NaN.

As another example, the operation represented by Equation 5 has been described above as being performed in the second mode. This operation yields the first bit string when operating in the second mode. However, when the same operation on the same input codes is instead performed when operating in the first mode, the execution unit 18 produces as a result, a bit string (e.g. all zeros) representing unsigned zero, rather than the first bit string that is produced when operating in the second mode.

Hence, the resulting output code from the same operation on the same input codes differs depending upon the mode of operation of the processing device 4.

In embodiments having a plurality of worker threads, the first and second mode may be separately defined for each worker thread. A separate indication is stored in each of the context register files 26 of the worker threads. It would be understood by the skilled person that reference to operations performed with respect to a thread or an indication of a first and second mode described herein may be taken to mean that the operations are performed with respect to each of a plurality of threads and a plurality of associated mode indications. The mode indication for a thread is stored in the floating-point control register (represented by the register name: $FP_CTL) shown as FPCR in FIG. 3 that is part of the control register associated with a worker thread. The indication stored in this register is copied from a floating-point control register initial value (represented by the register name: $FP_ICTL), which is part of the control register CXS of a supervisor thread.

The copied indication of the mode then causes the worker thread in question to operate in accordance with the mode which it indicates.

In some embodiments, a worker thread may be configured to modify the indication of the mode stored in its own status register. In this case, the processing unit 10 may execute one or more operations associated with the worker thread to modify the indication of the mode stored in the control register of the worker.

In some embodiments, the worker can read the stored indication from one or more status registers of the supervisor. In this case, the processing unit 10 may copy the indication of the mode to a control register of the worker thread from a control register of the supervisor thread, when the worker starts. The worker may change the indication if required.

By enabling threads to operate in two different modes, it is possible to switch between the different modes depending on the required preferences. In some cases, it may be required to perform debugging, and in this case the first mode may be enabled so as to permit representation of NaNs. A NaN in the end result can be interpreted as indicating that an error has occurred. The NaN may signal an exception. This has value for debugging purposes, where a programmer needs to be able to identify errors in the output so as to determine any faults in the system. In other cases, it may be required to achieve greater accuracy for certain types of calculations. In this case, the second mode may be enabled to permit representation of negative zero.

In the case that the indication of the mode indicates that the worker thread is operating in a first mode, the floating-point control register stores the following:

$$\$FP\_CTL.MODE{=}0b0$$

The processing unit 10 is configured to read this indication that the thread is operating in the first mode, and, in response, to interpret the first bit string as representing a NaN. As noted, when such a NaN is encountered by the processing unit 10 (either by operating on the NaN as an input or by generating the NaN as the result of an operation), the processing unit 10 is configured to store in a register, an invalid operation indication, indicating an exception. The invalid operation indication is stored by setting an invalid operation flag in the status register of the thread that encountered the NaN. The indication is stored in the floating-point status register of the status register of the worker thread, and may take the form:

$$\$FP\_STS.INV{==}0b1$$

The invalid operation flag provides an indication that an invalid operation generating an undefined result has occurred in the calculations performed by the worker thread. The setting of the invalid operation flag is used to raise an exception to indicate that an invalid operation has occurred. Since the NaN that is produced as a result of the calculation is a signalling NaN, an exception will be raised upon generation of the NaN or when a calculation is performed taking the NaN as an input.

In the alternative case that the indication of the mode indicates that the worker thread is operating in the second mode, the floating-point control register stores the following:

$$\$FP\_CTLMODE{=}0b1$$

The processing unit 10 is configured to read this indication that the relevant thread is operating in the second mode, and in response, to interpret the first bit string as representing a negative zero.

The indication as to the mode of operation for a thread may be an indication associated with a predefined level of precision. In other words, the indication applies to floating point numbers of that precision level only. For example, the indication as to whether the thread operates in the first mode or the second mode, may be an indication as to whether the thread operates in the first mode or the second mode for 8-bit floating point numbers. In this case, operations performed by the execution unit 18 on single-precision or half-precision floating point numbers are unaffected by the mode indication discussed.

Figure 5:
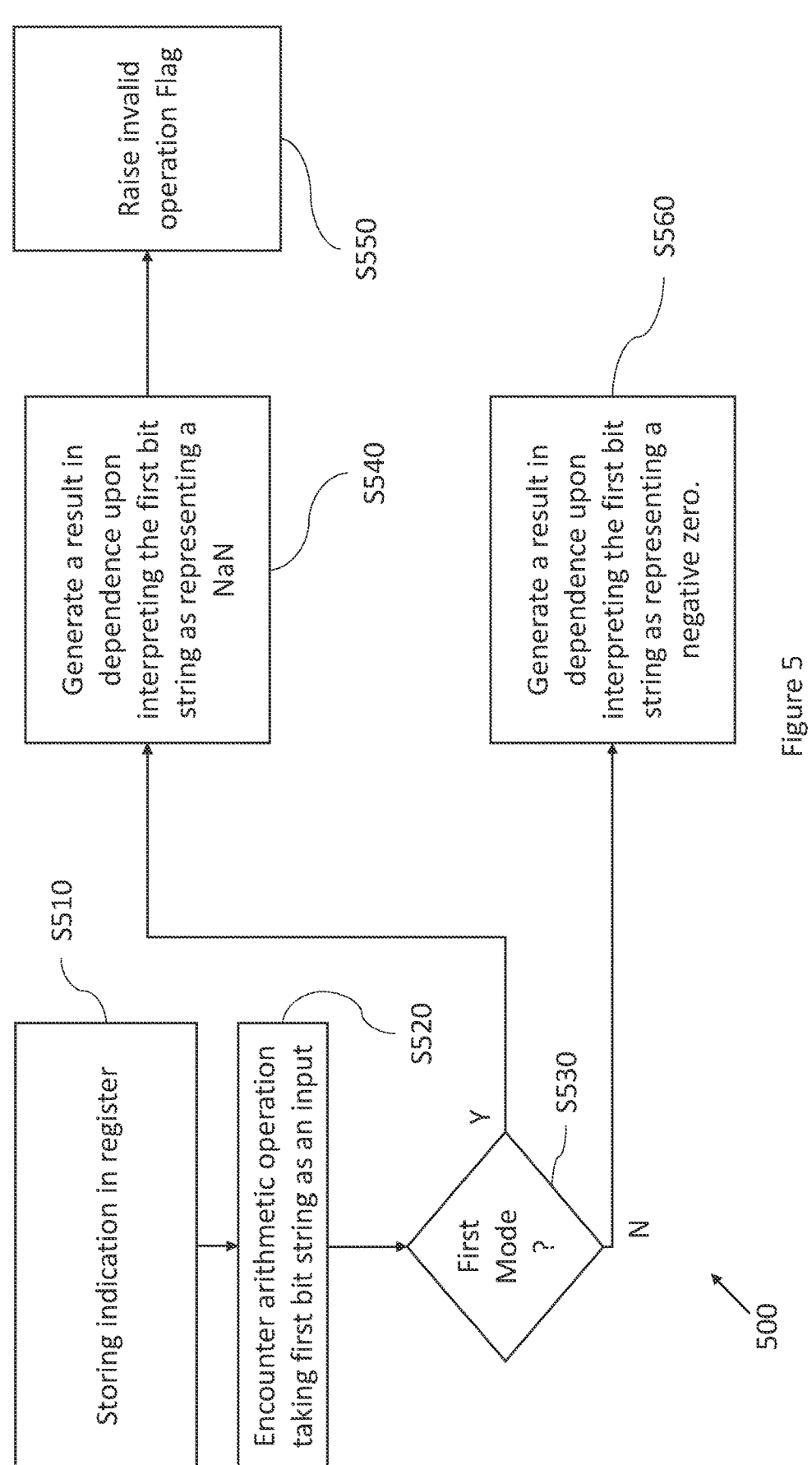
FIG. 5 illustrates a method for processing a first bit string according to the mode of operation of the processing device.

Reference is made to FIG. 5, which illustrates a method 500 for operating on the first bit string, where the result of the operation depends upon the mode indication.

At S510, the processing unit 10 stores in a register, a mode indication as to whether a thread is configured to operate in the first mode or the second mode. The indication is stored in a control register associated with the thread, and may be stored based on information loaded from the control register CXS of the supervisor thread. Note that step S510 is a precursor step, which is carried out automatically or manually ahead of runtime. Thus, it may be implemented by a separate program to that which performs the remaining step of method 500. Additionally this step may be performed by a separate execution unit of the processing unit 10 to the execution 18 described as performing the arithmetic operations.

At S520, the execution unit 18 encounters, in the sequence of instruction it is executing, an arithmetic operation involving one or more floating point numbers, each of which functions as an operand of the arithmetic operation. At least one of the operands is the first bit string discussed above. The arithmetic operation is part of the instructions stored for the thread in the instruction memory 12.

At S530, the execution unit 18 is configured to read the indication stored in the register to determine whether or not the thread is configured to operate in the first mode or the second mode. In response to determining that the thread is configured to operate in the first mode, the method proceeds to S540. In response to determining that the thread is configured to operate in the second mode, the method proceeds to S560.

At S540, the execution unit 18 generates a result of the arithmetic operation encountered at S520 by interpreting the first bit string as representing a NaN. Since (in accordance with Equation 3), the result of such an arithmetic operation performed on a NaN is also a NaN, the processing unit 10 stores the first bit string as the result of the arithmetic operation. At S550, the processing unit 10 raises the invalid operation flag.

At S560, the execution unit 18 generates a result in dependence upon interpreting the first bit string as representing a negative zero. The result of the arithmetic operation in this case may vary in dependence upon the particular operation being performed. One example of an operation taking a negative zero as an input is shown in Equation 4, and in this case, the processing unit 10 performs S560 by storing a bit string representing positive zero as the result.

Figure 6:
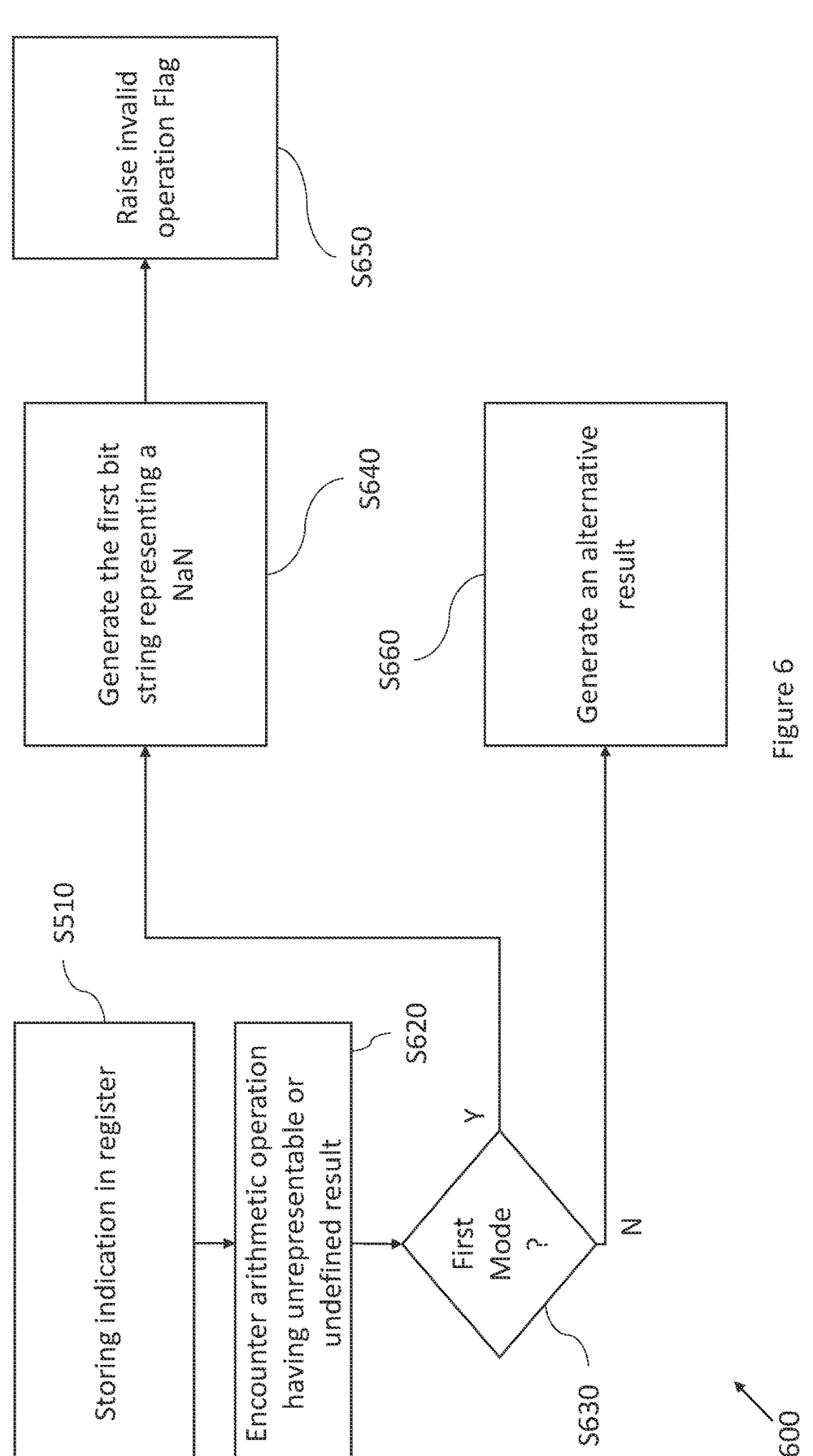
FIG. 6 illustrates a method for determining the result of a first type of arithmetic operation in dependence upon the mode indication.

Reference is made to FIG. 6, which illustrates a method 600 for performing an arithmetic operation, where the first bit string may or may not be output in dependence upon the mode indication.

At S510, the mode indication is stored as discussed above with respect to FIG. 5.

At S620, an arithmetic operation is encountered in the sequence of instructions executed by the execution unit 18, where the encountered arithmetic operation has an undefined result or unrepresentable result. Such an example operation is given by Equation 1 above. A more general example of an arithmetic operation that may be encountered at S620 is an operation that causes an overflow condition by producing a result that is too large in magnitude to be represented using the bit strings available according to the first floating-point format. The arithmetic operation encountered at S620 is part of the instructions stored for the thread in the instruction memory 12.

At S630, the execution unit 18 is configured to read the indication stored in the register to determine whether or not the thread is configured to operate in the first mode or the second mode. In response to determining that the thread is configured to operate in the first mode, the method proceeds to S640. In response to determining that the thread is configured to operate in the second mode, the method proceeds to S660.

At S640, the execution unit 18 provides the first bit string as the result of the arithmetic operation, the first bit string representing a NaN. At S650, the execution unit 18 also sets the invalid operation flag so as to raise an exception.

At S660, the execution unit 18 generates an alternative value, different to the first bit string, and outputs this as the result of the arithmetic operation. For example, if the arithmetic operation is a divide by zero, as shown in Equation 1, the execution unit 18 may output as the result, the highest possible normal number representable in the first floating-point format.

Figure 7:
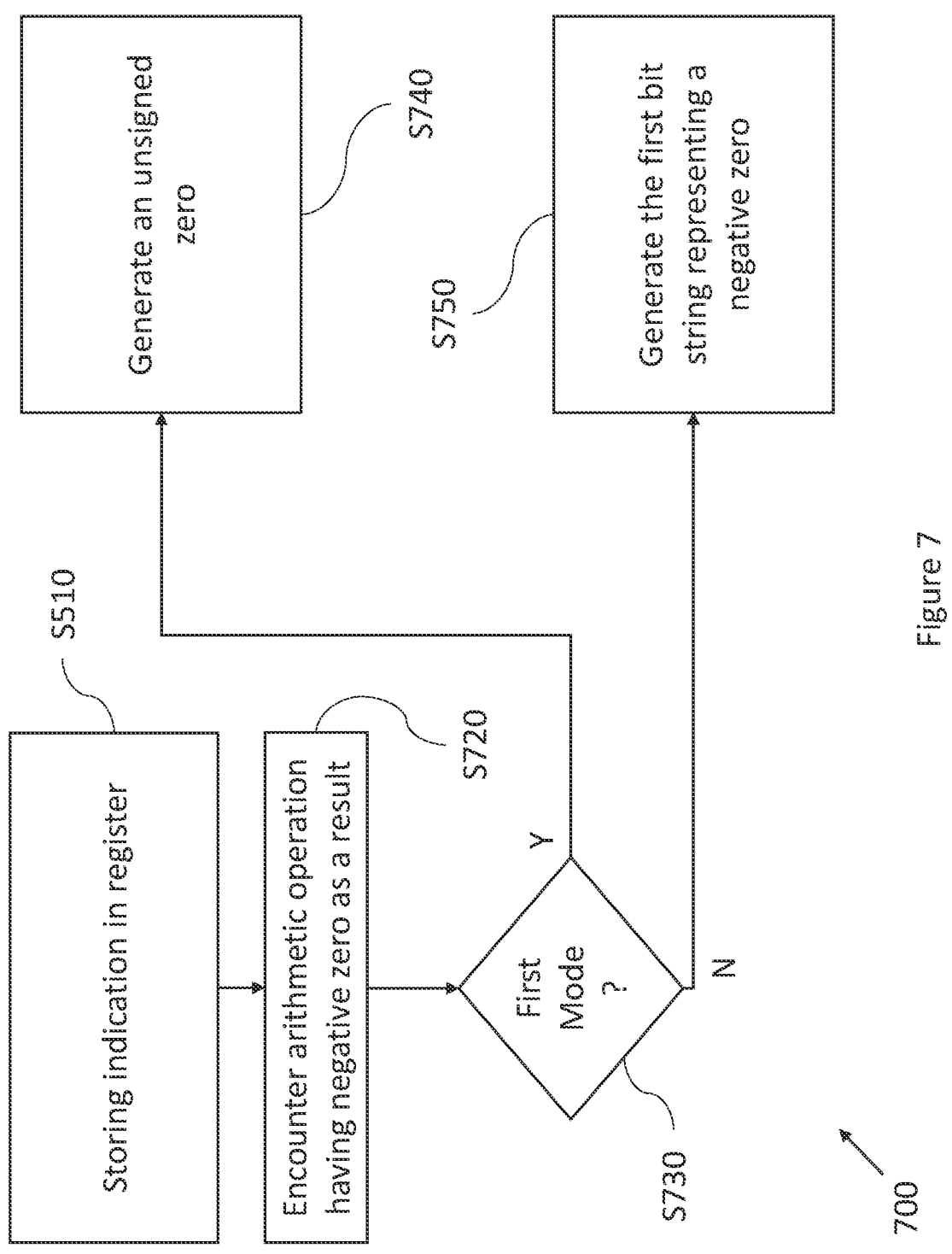
FIG. 7 illustrates a method for determining the result of a second type of arithmetic operation in dependence upon the mode indication.

Reference is made to FIG. 7, which illustrates another example of a method 700 for performing an arithmetic operation, where the first bit string may or may not be output in dependence upon the mode indication.

At S510, the mode indication is stored as discussed above with respect to FIG. 5.

At S720, an arithmetic operation is encountered in the sequence of instructions executed by the execution unit 18, where the encountered arithmetic operation may be taken to produce a negative zero result. Such an example operation is given by Equation 5 above. The arithmetic operation encountered at S720 is part of the instructions stored for the thread in the instruction memory 12.

At S730, the execution unit 18 is configured to read the indication stored in the register to determine whether or not the thread is configured to operate in the first mode or the second mode. In response to determining that the thread is configured to operate in the first mode, the method proceeds to S740. In response to determining that the thread is configured to operate in the second mode, the method proceeds to S750.

At S740, the execution unit 18 generates as a result of the arithmetic operation, a bit string (e.g. all zeros) representing an unsigned zero.

At S750, the execution unit 18 generates as a result of the arithmetic operation, the first bit string, which represents a negative zero.

Reference is made to FIG. 8, which illustrates an example method 800 in which the processing unit 10 performs multiple arithmetic operations in different modes of operation.

At S810, the processing unit 10 stores in its control register, an indication of the first mode. This step may comprise the step S510 performed in any of methods 500, 600, 700 described above.

At S820, the execution unit 18 checks the mode indication that was stored at S810 and in response to the mode indication indicating the first mode, determines a result of a first of the arithmetic operations in dependence upon interpreting the first of the bit strings as representing an undefined value (i.e. a NaN). In performing this step, the first of the bit strings may be used as an input to the first of the arithmetic operations, in which case step S820 comprises step S540. Additionally or alternatively, the first of the bit strings may be a result of the first of the arithmetic operations, in which case step S820 comprises step S640.

At S830, the processing unit 10 overwrites the mode indication stored at S810 with a new mode indication indicating the second mode.

At S840, the execution unit 18 checks the mode indication that was stored at S830 and in response to the mode indication indicating the second mode, determines a result of a second of the arithmetic operations in dependence upon interpreting the first of the bit strings as representing negative zero. In performing this step, the first of the bit strings may be an input to the second of the arithmetic operations, in which case step S840 comprises step S560. Additionally or alternatively, the first of the bit strings may be a result of the first of the arithmetic operations, in which case step S840 comprises step S750.

Figure 9:
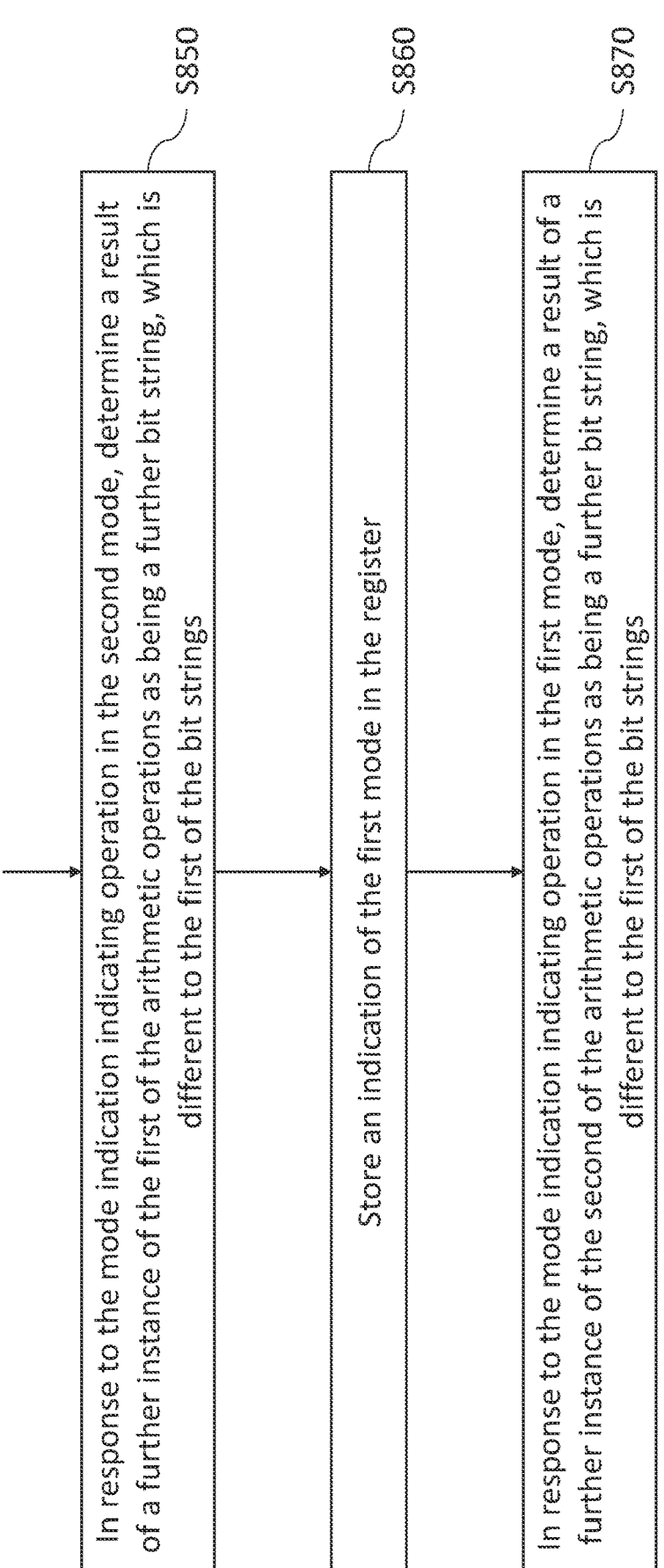
FIG. 9 illustrates steps including performing further instances of the arithmetic operations that are performed as part of the method illustrated in FIG. 8.

Reference is made to FIG. 9, which illustrates further steps that may optionally be performed after S840 shown in FIG. 8.

At S850, the execution unit 18 performs a further instance of the first of the arithmetic operations that was performed in S820. This further instance is the same type of operation and takes the same operands. Since the execution unit 18 is now operating in the second mode, it produces as a result, a further bit string, which is different to the first of the bit strings. As an example, Equation 1 may represent the first of the arithmetic operations, with the result being the first bit string when operating in the first mode and a saturated value when operating in the second mode.

At S860, the mode indication is overwritten to indicate the first mode.

At S870, the execution unit 18 performs a further instance of the second of the arithmetic operations that was performed in S840. This further instance is the same type of operation and takes the same operands. Since the execution unit 18 is now operating in the first mode, it produces as a result, a further bit string, which is different to the first of the bit strings. As an example, Equation 5 may represent the second of the arithmetic operations, with the result being the first bit string when operating in the second mode and the result being a bit string representing unsigned zero when operating in the first mode.

It would be appreciated that the above embodiments have been described by way of example only.

The invention claimed is:

1. A processing device configured to interleave execution of a plurality of threads, the processing device comprising:
an execution unit configured to execute instructions to perform operations, wherein the execution unit is configured to take at least one of a set of floating-point values as an input and produce as a result, at least one of the set of floating-point values as an output, wherein each of the set of floating-point values is represented by a respective one of a plurality of bit strings, each of the plurality of bit strings having a predefined length and provided according to a first floating-point format,
a plurality of registers comprising a plurality of floating-point control registers and a plurality of status registers,
wherein each of the plurality of floating-point control registers is associated with a corresponding one of the plurality of threads,
wherein the plurality of floating-point control registers is configured to store a plurality of mode indications,
wherein each of the plurality of mode indications indicates whether one of the operations performed by its associated thread are performed in a first mode or a second mode, wherein each of the plurality of status registers is associated with a corresponding one of the plurality of threads,
wherein the execution unit is further configured to, for each of the plurality of threads:
read the mode indication stored in an associated floating-point control register of the plurality of floating-point control registers;
perform a first of the operations, and in response to the mode indication indicating operation in the first mode:
determine a result of the first of the operations in dependence upon interpreting a first of the bit strings as representing an undefined value;
raise an exception by setting an invalid operation flag in response to performing the first of the operations; and
store the invalid operation flag in an associated status register from the plurality of status registers; and
perform a second of the operations, and in response to the mode indication indicating operation in the second mode, determine a result of the second of the operations in dependence upon interpreting the first of the bit strings as representing a negative zero.

2. The processing device of claim 1, wherein the execution unit is configured to:
perform the first of the operations by using the first of the bit strings as an input value for the first of the operations.

3. The processing device of claim 1, wherein the execution unit is further configured to:
perform the second of the operations using the first of the bit strings as an input value for the second of the operations.

4. The processing device of claim 1, wherein the execution unit is further configured to:
output the first of the bit strings as the result of the first of the operations in response to determining that the mode indication indicates operation in the first mode.

5. The processing device of claim 4, wherein the first of the operations has an unrepresentable result that is too large in magnitude to be represented in the first floating-point format.

6. The processing device of claim 4, wherein the execution unit is further configured to subsequently perform a further instance of the first of the operations, wherein the execution unit is configured to:
in response to determining that the mode indication indicates operation in the second mode, output a further bit string, which is different to the first of the bit strings, as a result of the further instance of the first of the operations.

7. The processing device of claim 1, wherein the execution unit is further configured to:
output the first of the bit strings as an output value of the second of the operations in response to determining that the mode indication indicates operation in the second mode.

8. The processing device of claim 7, wherein the execution unit is further configured to subsequently perform a further instance of the second of the operations, wherein the execution unit is configured to:
output a further bit string, which is different to the first of the bit strings, as result of the further instance of the second of the operations and in response to determining that the mode indication indicates operation in the first mode.

9. The processing device of claim 1, wherein the predefined length is fewer than 16 bits.

10. The processing device of claim 9, wherein the predefined length is 8 bits.

11. The processing device of claim 1, wherein the execution unit is further configured to:

perform a third of the operations by interpreting a second bit string as representing unsigned zero in response to the mode indication indicating the first mode; and perform a fourth of the operations by interpreting the second bit string as representing positive zero in response to the mode indication indicating the second mode.

12. The processing device of claim 1, wherein the mode indication applies for the first floating-point format, but not for a second floating-point format.

13. The processing device of claim 1, wherein the execution unit is further configured to, when performing the operations:

interpret a second of the bit strings as representing a zero; and interpret each remaining possible bit sequence, other than the first of the bit strings and the second of the bit strings, that is provided according to the first floating-point format, as representing a non-zero real number.

14. A method of interleaving execution of a plurality of threads in a processing device comprising a plurality of floating-point control registers and a plurality of status registers, the method comprising:

storing a plurality of mode indications, in the plurality of floating-point control registers, wherein each of the plurality of mode indications indicates whether an associated thread of the plurality of threads operates according to a first mode or a second mode;

executing instructions to perform operations, wherein each of the operations takes a floating-point input represented by a bit string of a plurality of bit strings and produces, as a result, a floating-point output represented by another bit string of the plurality of bit strings, wherein each bit string of the plurality of bit strings has a predefined length and conforms to a first floating-point format;

for a first of the plurality of threads:

reading a first mode indication from an associated floating-point control register of the plurality of floating-point control registers;

performing a first of the operations in the first mode indicated by the first mode indication, comprising:

determining a result of the first of the operations in dependence upon interpreting a first of the bit strings as representing an undefined value;

raising an exception by setting an invalid operation flag in response to performing the first of the operations; and storing the invalid operation flag in an associated status register from the plurality of status registers; and for a second of the plurality of threads:

reading a second mode indication from an associated floating-point control register of the plurality of floating-point control registers;

performing a second of the operations in the second mode indicated by the second mode indication, comprising determining a result of the second of the operations in dependence upon interpreting the first of the bit strings as representing a negative zero.

15. The method of claim 14, wherein performing the first of the operations includes using the first of the bit strings as an input value for the first of the operations.

16. The method of claim 14, wherein performing the second of the operations includes using the first of the bit strings as an input value for the second of the operations.

17. The method of claim 14, the method further comprising:

outputting the first of the bit strings as the result of the first of the operations.

18. The method of claim 17, wherein the first of the operations has an unrepresentable result that is too large in magnitude to be represented in the first floating-point format.

19. A non-transitory computer readable medium storing a computer program comprising a set of computer executable instructions, which when executed by a processing device comprising a plurality of floating-point control registers and a plurality of status registers cause a method of interleaving execution of a plurality of threads to be performed, the method comprising:

storing a plurality of mode indications, in the plurality of floating-point control registers, wherein each of the plurality of mode indications indicates whether an associated thread of the plurality of threads operates according to a first mode or a second mode;

executing instructions to perform operations, wherein each of the operations takes a floating-point input represented by a bit string of a plurality of bit strings and produces, as a result, a floating-point output represented by another bit string of the plurality of bit strings, wherein each bit string of the plurality of bit strings has a predefined length and conforms to a first floating-point format;

for each of the plurality of threads:

reading the mode indication from an associated floating-point control register of the plurality of floating-point control registers;

performing a first of the operations, and in response to the mode indication indicating operation in the first mode:

determining a result of a first of the operations in dependence upon interpreting a first of the bit strings as representing an undefined value;

raising an exception by setting an invalid operation flag in response to performing the first of the operations; and storing the invalid operation flag in an associated status register from the plurality of status registers; and performing a second of the operations, and in response to the mode indication indicating operation in the second mode, determining a result of the second of the operations in dependence upon interpreting the first of the bit strings as representing a negative zero.

20. The non-transitory computer readable medium of claim 19, wherein the method further includes:

outputting the first of the bit strings as an output value of the second of the operations in response to determining that the mode indication indicates operation in the second mode.

21. The non-transitory computer readable medium of claim 19, wherein the method further includes:

subsequently performing a further instance of the second of the operations; and outputting a further bit string, which is different to the first of the bit strings, as result of the further instance of the second of the operations and in response to determining that the mode indication indicates operation in the first mode.

\* \* \* \* \*